United States Patent [19]

Ohshita

[11] Patent Number: 5,144,480
[45] Date of Patent: Sep. 1, 1992

[54] KEPLERIAN ZOOM FINDER OPTICAL SYSTEM

[75] Inventor: Koichi Ohshita, Tokyo, Japan

[73] Assignee: Nikon Corporation, Tokyo, Japan

[21] Appl. No.: 775,605

[22] Filed: Oct. 15, 1991

[30] Foreign Application Priority Data

Oct. 22, 1990 [JP] Japan .................. 2-283964
Nov. 28, 1990 [JP] Japan .................. 2-328220

[51] Int. Cl.$^5$ ................ G02B 23/14; G02B 15/177; G03B 13/02
[52] U.S. Cl. .................................. 359/432; 359/422; 359/682; 359/691
[58] Field of Search ............... 359/432, 422, 682, 691

[56] References Cited

U.S. PATENT DOCUMENTS

| | | | |
|---|---|---|---|
| 4,842,395 | 6/1989 | Sato et al. | 359/432 |
| 4,906,078 | 3/1990 | Inabata et al. | 359/422 |
| 5,005,955 | 4/1991 | Ohshita | 350/423 |
| 5,086,363 | 2/1992 | Mukai et al. | 359/432 |

FOREIGN PATENT DOCUMENTS

2-109009 4/1990 Japan.

Primary Examiner—Jon W. Henry
Attorney, Agent, or Firm—Shapiro and Shapiro

[57] ABSTRACT

A Keplerian zoom finder optical system includes an objective lens unit comprising a forward group having negative refractive power and a rearward groups having positive refractive power, the objective lens unit having positive refractive power as a whole and having the magnification changing function of changing the finder magnification by the spacing between the forward group and the rearward group being changed, an eyepiece unit having positive refractive power for enlarging and observing therethrough a spatial image formed by the objective lens unit, and an image erecting optical system for erecting an inverted spatial image formed by the objective lens unit. The forward group in the objective lens unit comprises a first lens having negative refractive power and a positive meniscus-shaped second lens having its convex surface facing the object side, and is designed to have negative refractive power as a whole. The rearward group in the objective lens unit comprises a biconvex third lens, a negative meniscus-shaped fourth lens cemented to the third lens and having its concave surface facing the object side, and a positive meniscus-shaped fifth lens having its convex surface facing the image side, and is designed to have positive refractive power as a whole.

17 Claims, 6 Drawing Sheets

KEPLERIAN ZOOM FINDER OPTICAL SYSTEM

BACKGROUND OF THE INVENTION

1. Field of the Invention

This invention relates to a magnification-changeable viewfinder optical system, and particularly to a Keplerian zoom finder optical system suitable for use in a compact camera.

2. Related Background Art

In recent years, in lens shutter type compact cameras, zoom lenses having a great zoom ratio have been required as photo-taking objective lenses, and with it, zoom finders having a great magnification change rate have become necessary also in camera finders As zoom finders of this kind, there are, for example, Japanese Laid-Open Patent Application No. 2-109009 which has been proposed by the applicant and already laid open, etc., and basically, these are such that the objective lens of a Keplerian telescope optical system in which a real image formed by the objective lens is enlarged and observed through an eyepiece is made into zoom, whereby the finder magnification is made continuously changeable.

The zoom finder disclosed in the above-mentioned Japanese Laid-Open Patent Application No. 2-109009 has a magnification change ratio (zoom ratio) of the order of 2.3 times and a field (angle of field) of the order of 55 degrees at the wide angle end and has an excellent optical performance.

This zoom finder, however, can hardly be said to be sufficient in respect of wide angle and high magnification change, and further, an attempt to endow this zoom finder with a great magnification change ratio has resulted in the possibility of making the finder optical system bulky.

SUMMARY OF THE INVENTION

So, the present invention has as its object the provision of a zoom finder which can achieve a super-wide angle amounting to 66 degrees or more in the angle of view (field) and a high magnification change ratio amounting to 2.85 times in magnification change ratio (zoom ratio) and yet is compact and high in performance.

To achieve the above object, the finder optical system according to the present invention is a Keplerian zoom finder optical system including an objective lens unit of positive refractive power having a magnification changing function, an eyepiece unit having positive refractive power for enlarging and observing therethrough a spatial image formed by said objective lens unit, and an image erecting optical system for erecting an inverted spatial image formed by said objective lens unit, said objective lens unit having a forward group having negative refractive power and a rearward group having positive refractive power, said forward group comprising a first lens having negative refractive power and a positive meniscus-shaped second lens having its convex surface facing the object side, said rearward group comprising a biconvex third lens, a negative meniscus-shaped fourth lens cemented thereto and having its concave surface facing the object side, and a positive meniscus-shaped fifth lens having its convex surface facing the image side. Further, the zoom finder optical system is designed such that the spacing between the forward group and the rearward group is changed to thereby vary the finder magnification.

In the zoom finder optical system of the present invention as described above, the negative forward group in the objective lens unit is made into a two-lens construction comprising the negative first lens and the meniscus-shaped second lens having positive refractive power, whereby distortion of which the correction has been insufficient in the prior-art zoom finder can be corrected very well and the field of view at the wide angle end can be enlarged. Also, the positive rearward group having a magnification changing function in the objective lens unit is comprised of the biconvex third lens, the meniscus-shaped negative fourth lens cemented thereto and having its convex surface facing the object side, and the meniscus-shaped positive fifth lens having its convex surface facing the object side, whereby the relative aperture of the lens is secured greatly and yet aberration fluctuation over a wide magnification change range can be suppressed.

Further, it is desirable that the rearward group be designed to satisfy the following conditions (1) and (2):

$$-0.6 < r_6/f_R < -0.3 \tag{1}$$

$$-0.12 < r_8/f_5 < -0.08, \tag{2}$$

where
- $r_6$: the radius of curvature of the cemented surface of the third lens and the fourth lens,
- $f_R$: the focal length of the rearward group in the objective lens unit,
- $r_8$: the radius of curvature of that surface of the fifth lens which faces to the object side,
- $f_5$: the focal length of the fifth lens.

By designing the objective lens unit as described above, there can be realized a Keplerian zoom finder in which good aberration correction is possible and which is of a compact form and keeps an excellent optical performance in all magnification change ranges and yet is of wide angle and high in magnification change.

Also, it is desirable that in addition to the fifth lens in the rearward group being designed to satisfy the above-mentioned condition (2), the third lens and the fourth lens be designed to satisfy the following condition in order that chromatic aberration which increases with compactness and a higher magnification may be corrected well:

$$18 < \nu_3 - \nu_4 < 30, \tag{3}$$

where
- $\nu_3$: the Abbe number of the third lens,
- $\nu_4$: the Abbe number of the fourth lens.

Other objects, features and effects of the present invention will become fully apparent from the following detailed description taken in conjunction with the accompanying drawings.

DESCRIPTION OF THE PREFERRED EMBODIMENTS

Some embodiments of the present invention will hereinafter be described in detail with reference to the accompanying drawings.

FIGS. 1A to 6C are construction views of zoom finder optical systems showing the optical arrangements and optical paths of first to sixth embodiments, respectively, of the present invention, and in each of these figures, A shows the optical system arrangement in a minimum magnification state (wide angle end), B shows the optical system arrangement in an intermediate magnification state, and C shows the optical system arrangement in a maximum magnification state (telephoto end).

Each of the Keplerian zoom finder optical systems of the present invention, as shown in FIGS. 1A to 6C, basically comprises, in succession from the object side, an objective lens unit O comprising five lenses and having a zoom magnification changing function, a field lens unit F comprising a single positive lens, and an eyepiece unit E comprising a single positive lens or two positive lenses.

The objective lens unit O comprises a forward group $G_F$ having negative refractive power and a rearward group $G_R$ having positive refractive power, and the forward group $G_F$ comprises, in succession from the object side, a first lens $L_1$ having its concave surface of sharper curvature facing the image side and having negative refractive power, and a positive meniscus-shaped second lens $L_2$ having its convex surface facing the object side. The rearward group $G_R$ comprises, in succession from the object side, a biconvex third lens $L_3$, a positive meniscus-shaped fourth lens $L_4$ comented thereto and having its convex surface facing the image side, and a positive meniscus-shaped fifth lens $L_5$ having its convex surface facing the image side.

The magnification change from the wide angle end (minimum magnification state) to the telephoto end (maximum magnification state) is accomplished by varying the spacing between the forward group $G_F$ and the rearward group $G_R$ for decrease. Specifically, as shown, the forward group $G_F$ is moved while describing a μ-turn locus and the rearward group $G_R$ is moved nonrectilinearly toward the object side.

Figure 1A:
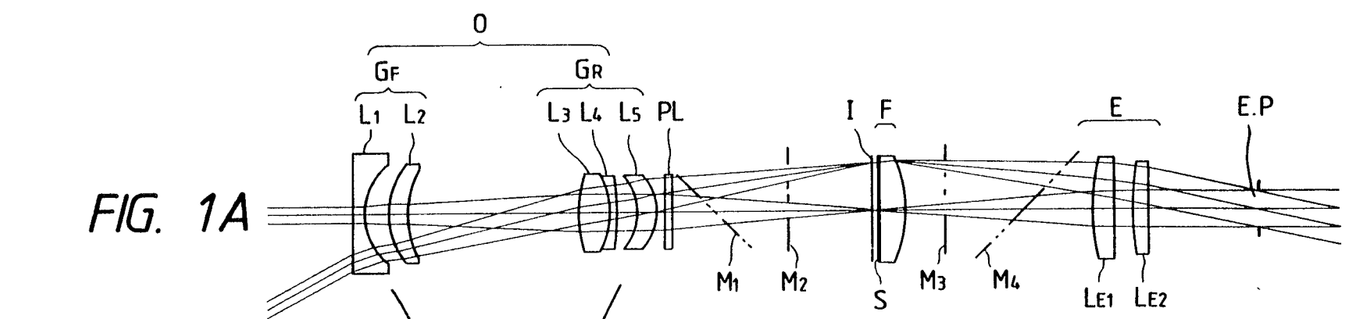
FIGS. 1A to 1C are construction views of finder optical systems showing the optical arrangement and optical path of a first embodiment of the present invention.
Figure 1B:
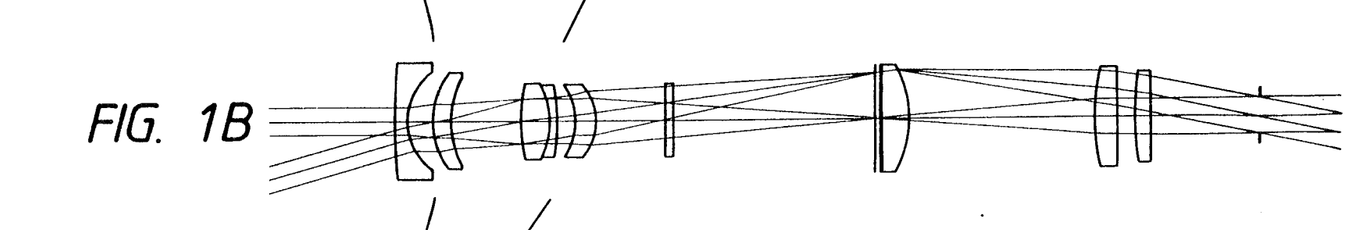
Figure 1C:
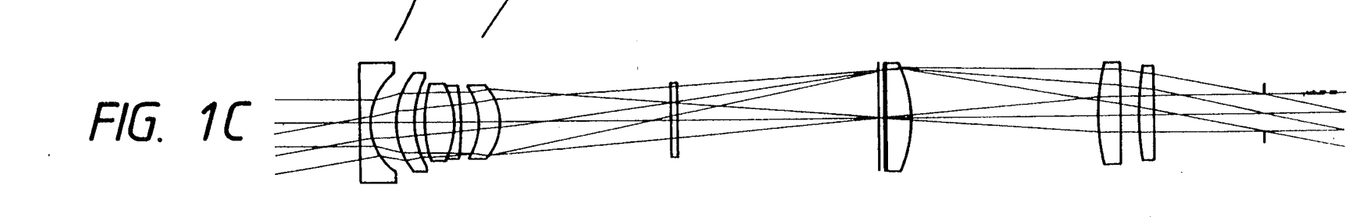
Figure 2A:
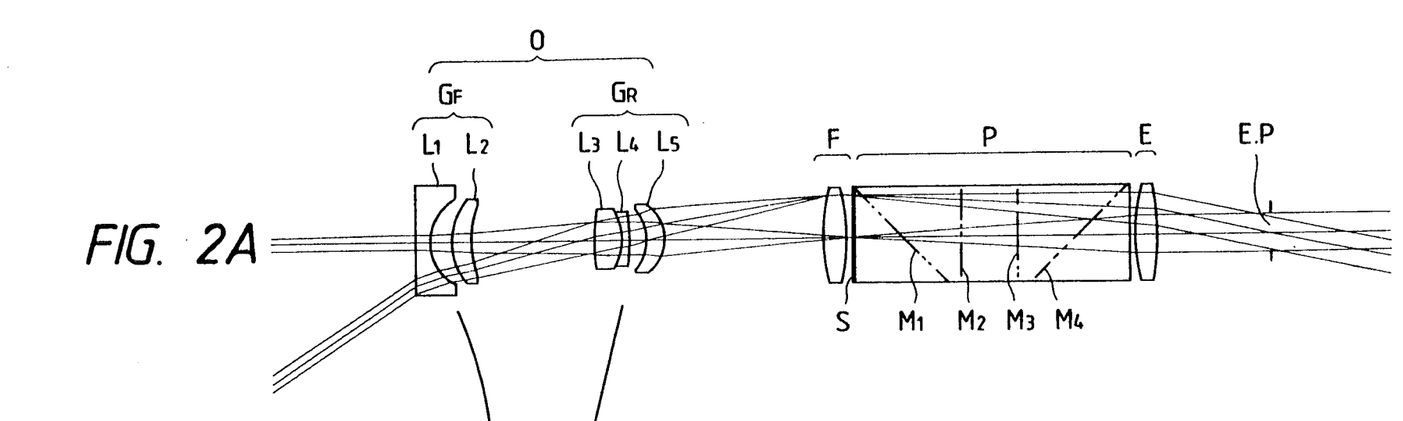
FIGS. 2A to 2C are construction views of finder optical systems showing the optical arrangement and optical path of a second embodiment of the present invention.
Figure 2B:
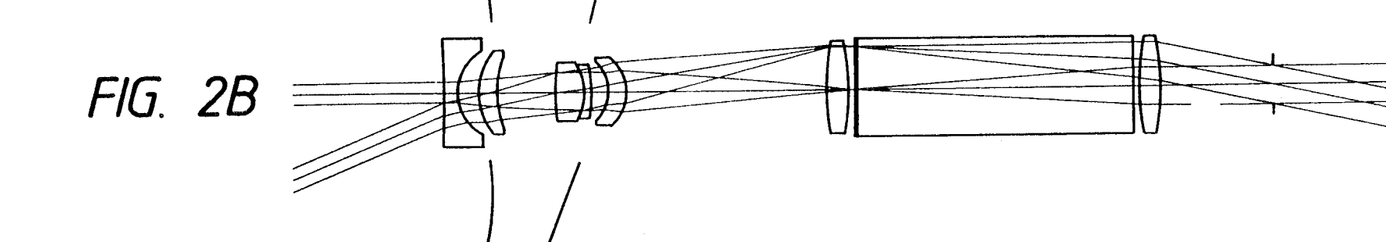
Figure 2C:
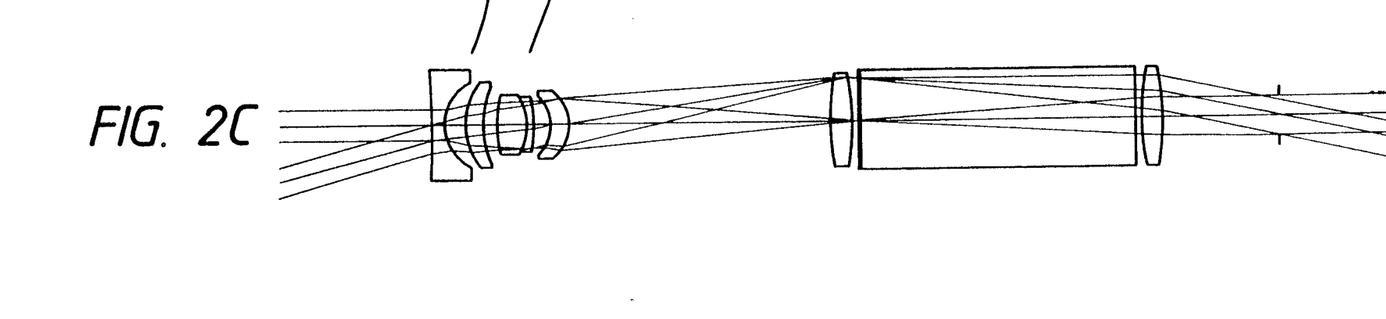

Now, the Keplerian zoom finder of the present invention, as shown in FIGS. 1A to 1C, is basically designed such that the spatial image (intermediate image) I of an object is formed by the zoom objective lens O having two negative and positive groups and the spatial image I is enlarged and observed through the eyepiece unit E and the spacing between the forward group $G_F$ having negative refractive power and the rearward group $G_R$ having positive refractive power which constitute the zoom objective lens O is varried, whereby the finder magnification can be continuously changed.

In the zoom finder having such a magnification changing objective lens, to achieve further compactness than before, it is necessary to strengthen the refractive powers of the objective lens and the eyepiece, but the realization of this will involve great difficulties from two problems shown below.

A first problem is that the enhanced refractive powers of both the objective lens and the eyepiece means that the real image formed by the objective lens becomes smaller and it is enlarged and observed through the eyepiece and therefore the aberrations of both the objective lens and the eyepiece are more enlarged.

A second problem is that to obtain a predetermined pupil diameter, a zoom objective lens of greater relative aperture becomes necessary and this may result in the bulkiness of the finder system.

So, in the finder optical system of the present invention, the negative forward group $G_F$ in the objective lens unit is first made into a two-lens construction comprising the first lens $L_1$ of negative refractive power and the meniscus-shaped second lens $L_2$ of positive refractive power, whereby distortion of which the correction has been insufficient in the prior-art zoom finder is corrected very well and the widening of the field of view at the wide angle end (minimum magnification state) is realized.

Also, the positive rearward group $G_R$ having a magnification changing function in the objective lens unit O is comprised of the biconvex third lens $L_3$, the meniscus-shaped negative fourth lens $L_4$ cemented thereto and having its concave surface facing the object side, and the meniscus-shaped positive fifth lens $L_5$ having its convex surface facing the object side, whereby the relative aperture of the lens is secured greatly and yet the suppression of aberration fluctuation is realized.

Further, the present invention has found that by the rearward group $G_R$ satisfying the following conditions (1) and (2), the above-noted two problems can be solved well.

$$-0.6 < r_6/f_R < -0.3 \qquad (1)$$

$$-0.12 < r_8/f_5 < -0.08 \qquad (2)$$

where $r_6$: the radius of curvature of the cemented surface of the third lens $L_3$ and the fourth lens $L_4$, $f_R$: the focul length of the rearward group $G_R$ in the objective lens unit O, $r_8$: the radius of curvature of that surface of the fifth lens $L_5$ which faces to the object side, $f_5$: the focal length of the fifth lens $L_5$.

The above-mentioned conditional expression (1) prescribes the optimum radius of curvature of the cemented surface of the third lens $L_3$ and the fourth lens $L_4$, and is concerned in good correction of spherical aberration and coma when the relative aperture of the objective lens unit O becomes great. In the construction of the rear group $G_R$ in the objective lens unit as described above, when the relative aperture is made great, if the curvature of that surface of the fifth lens $L_5$ which faces to the object side is sharpened, the occurrence of high-order spherical aberrations will become remarkable, and if conversely, said curvature is weakened, the correction of coma will become difficult.

So, in the present invention, the radius of curvature $r_6$ of the cemented surface of the third lens $L_3$ and the fourth lens $L_4$ is kept within the range of conditional expression (1), thereby mitigating the burden of the fifth lens $L_5$ for aberration correction and suppressing the occurrence of high-order spherical aberrations. That is, if the lower limit of conditional expression (1) is exceeded, the radius of curvature of the cemented surface will be too great and therefore, high-order spherical aberrations occurring in the fifth lens $L_5$ cannot be suppressed. If conversely, the upper limit of this conditional expression is exceeded, the radius of curvature of the cemented surface will be too small and therefore, high-order aberrations will rather occur in the cemented surface. Further, if the radius of curvature of this cemented surface is small, the center thickness of the cemented lens comprising the third lens $L_3$ and the fourth lens $L_4$ cemented together will become too great to secure the edge thickness and it will become impossible to keep the inter-group spacing necessary for magnification change, and this is not preferable.

Conditional expression (2) prescribes the optimum proportion between the focal length of the positive meniscus-shaped fifth lens $L_5$ and the radius of curvature of that surface of the lens $L_5$ which is adjacent to the object side. If the upper limit of this conditional expression is exceeded, high-order spherical aberrations will become remarkable, and if conversely, the lower limit of this conditional expression is exceeded, the correction of coma at the telephoto end will become difficult.

Also, to solve the above-noted problems and correct well chromatic aberration which increases with compactness and a higher magnification, it is desirable that in addition to the fifth lens $L_5$ in the rearward group $G_R$ being designed to satisfy the aforementioned condition (2), the third lens $L_3$ and the fourth lens $L_4$ be designed to satisfy the following condition:

$$18 < \nu_3 - \nu_4 < 30, \quad (3)$$

where
$\nu_3$: the Abbe number of the third lens $L_3$,
$\nu_4$: the Abbe number of the fourth lens $L_4$.

This conditional expression (3) prescribes the optimum range of the difference between the Abbe numbers of the third lens $L_3$ and the fourth lens $L_4$ which constitute the cemented lens, and is for correcting well on-axis (longitudinal) chromatic aberration which greatly increases with compactness and a higher magnification. If the lower limit of this conditional expression (3) is exceeded, on-axis chromatic aberration will be under-corrected, and if conversely, the upper limit of this conditional expression is exceeded, chromatic difference of magnification at the telephoto end will increase, and this is not preferable.

Also, to accomplish more sufficient correction of astigmatism, it is desirable to satisfy the following condition:

$$0.68 < r_3/f_w < 0.85, \quad (4)$$

where $r_3$ is the radius of curvature of that surface of the second lens $L_2$ in the forward group $G_F$ which faces to the object side, and $f_w$ is the combined focal length of the objective lens unit O in the minimum magnification state (wide angle end).

Conditional expression (4) prescribes the optimum radius of curvature of that surface of the second lens $L_2$ which is adjacent to the object side, and is concerned in good correction of astigmatism. If the upper limit of this condition, the meridional image plane at the wide angle end will be of a great negative value, and if conversely, the lower limit of this condition is exceeded, the meridional image plane will be of a great positive value, and this is not preferable.

Now, in the aforementioned condition (1), the optimum radius of curvature $r_3$ of the cemented surface of the third lens $L_3$ and the fourth lens $L_4$ is prescribed, but for the better correction of spherical aberration, it is desirable to keep the refractive index of the negative fourth lens $L_4$ higher than the refractive index of the positive third lens $L_3$, and when the refractive index of the third lens $L_3$ is $n_3$ and the refractive index of the fourth lens $L_4$ is $n_4$, it is desirable to satisfy the following condition:

$$0.06 < n_4 - n_3 < 0.25. \quad (5)$$

If the lower limit of this conditional expression (5) is exceeded, spherical aberration will become difficult to correct on the cemented surface, and if conversely, the upper limit of this conditional expression is exceeded, spherical aberration will become over-corrected.

Also, in order that distortion and coma may be corrected well-balancedly, when the focal length of the first lens $L_1$ in the forward group $G_F$ is $f_1$ and the combined focal length $f_w$ of the forward group $G_F$ and the rearward group $G_R$ in the objective lens unit O at the wide angle end (minimum magnification state) is $f_w$, it is desirable to satisfy the following condition:

$$-1.22 < f_1/f_w < -0.97. \quad (6)$$

Conditional expression (6) prescribes the optimum refractive power distributions of the negative first lens $L_1$ and the positive second lens $L_2$ in the negative forward group $G_F$. If the upper limit of this conditional expression (6) is exceeded, the correction of coma at the telephoto end will become difficult when a greater relative aperture is contrived, and if conversely, the lower limit of this conditional expression is exceeded, negative distortion at the wide angle end will become very great and therefore, a good performance will not be obtained.

Now, in the Keplerian finder, to direct the exit pupil of the objective lens O to an appropriate eye point, the presence of the field lens unit F is important. Therefore, it is preferable that a field lens unit F having appropriate refractive power be disposed near the position at which the spatial image (intermediate image) of the objective lens unit O is formed, and when the focal length of the field lens unit F is $f_F$ and the focal length of the eyepiece unit E is $f_E$, it is more preferable to satisfy the following condition:

$$0.9 < f_F/f_E < 1.2. \quad (7)$$

If the lower limit of this conditional expression (7) is exceeded, the eye point position will become too close to the eyepiece unit E and observation will be difficult, and if the upper limit of this conditional expression is exceeded, the distance from the last surface of the eyepiece unit E to the eye point will become too long and this may result in the bulkiness of the eyepiece and the erecting optical system including a mirror, a prism, etc.

Further, to achieve good aberration correction well-balancedly in the entire zoom finder optical system, it is desirable that both of that surface of the first lens $L_1$ which faces to the image side and that surface of the positive meniscus-shaped fifth lens $L_5$ which faces to the image side be made into aspherical surfaces and these aspherical surfaces satisfy the following conditions:

$$0.180 \cdot r_2 < S_2(0.6 \cdot r_2) < 0.196 \cdot r_2 \quad (8)$$

$$0.180 \cdot r_9 < S_9(0.6 \cdot r_9) < 0.195 \cdot r_9 \quad (9)$$

where $S_2(y)$ and $S_9(y)$ respectively indicate the shapes of the aspherical surface of the first lens $L_1$ which faces to the image side and the aspherical surface of the fifth lens $L_5$ which is adjacent to the image side, and these indicate the distances from the tangential planes of the vertexes of the respective aspherical surfaces along the direction of the optical axis at a height y in the vertical direction from the optical axis in the respective aspherical surfaces. $r_2$ and $r_9$ are the paraxial radii of curvature, respectively, of the aspherical surface of the first lens $L_1$ which is adjacent to the image side and the aspherical surface of the fifth lens $L_5$ which faces to the image side.

However, when the cone coefficient is k and the nth-order aspherical surface coefficient is $A_n$ and the standard radius of curvature is R, an aspherical surface can generally be expressed by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10}$$

The above-mentioned paraxial radius of curvature r is $r = 1/(2 \cdot A_2 + 1/R)$.

Conditional expression (8) is for correcting distortion well. If the upper limit of this conditional expression is exceeded, the effect of the aspherical surface will be meager and good correction of distortion will be difficult, and if conversely, the lower limit of this conditional expression is exceeded, the effect of the aspherical surface will become excessive and an increase in astigmatism will be unavoidable.

Conditional expression (9) is for correcting spherical aberration at the telephoto end well. If the upper limit of this conditional expression is exceeded, the effect of the aspherical surface will become small and therefore, spherical aberration will be under-corrected, and if conversely, the lower limit of this conditional expression is exceeded, the effect of the aspherical surface will be excessive and spherical aberration will be over-corrected.

Now, to use the Keplerian finder as the finder of a camera, it is necessary that a field frame s corresponding to the film window of the camera be provided near the focal plane of the objective lens unit O and an image erecting optical system be provided in the optical path between the objective lens unit O and the eyepiece unit E.

The erection of the image in the first embodiment shown in FIG. 1A to 1C is accomplished by total four times of reflection by two reflecting surfaces $M_1$ and $M_2$ provided in the space between the objective lens unit O and the field lens unit F and two reflecting surfaces $M_3$ and $M_4$ provided in the space between the field lens unit F and the eyepiece unit E, as schematically indicated by dots-and-dash lines. In the first embodiment, a protective window $P_L$ is provided on the image side of the objective lens unit O to prevent the entry of dust from the objective lens side into the field lens side.

The erection of the image in the second, fourth and fifth embodiments shown in FIGS. 2A to 2C, 4A to 4C and 5A to 5C, respectively, is accomplished by total four times of reflection by four reflecting surfaces $M_1$–$M_4$ provided in the prism P, as schematically indicated by dots-and-dash lines. Alternatively, design may be made such that the erection of the image is accomplished by total four times of reflection by a reflecting surface provided in the space between the objective lens unit O and the field lens unit F and three reflecting surfaces provided in the prism P.

Figure 3A:
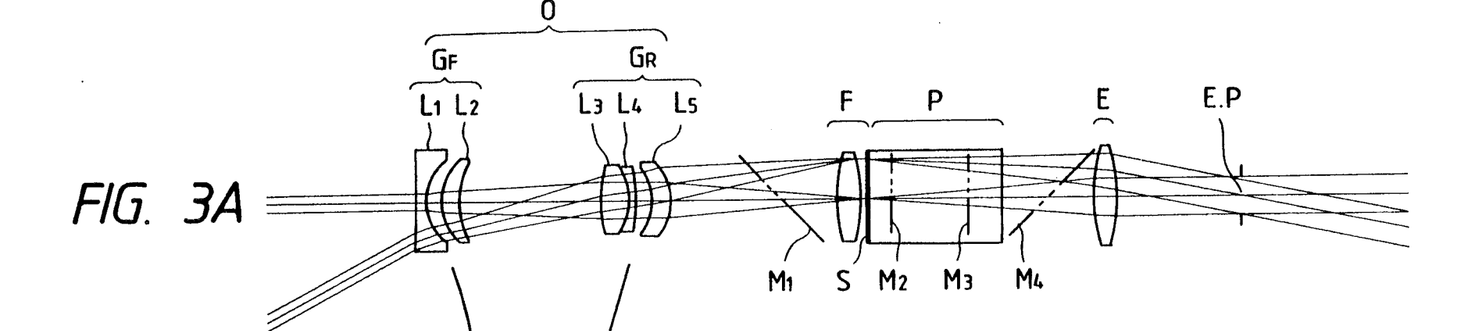
FIGS. 3A to 3C are construction views of finder optical systems showing the optical arrangement and optical path of a third embodiment of the present invention.
Figure 3B:
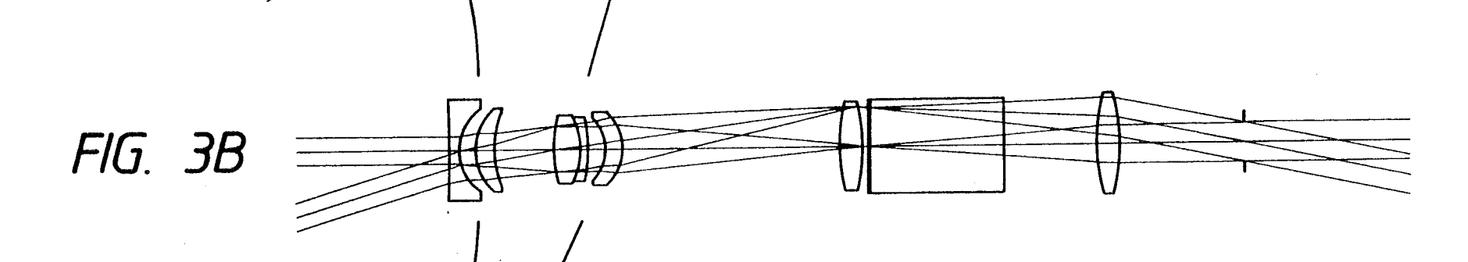
Figure 3C:
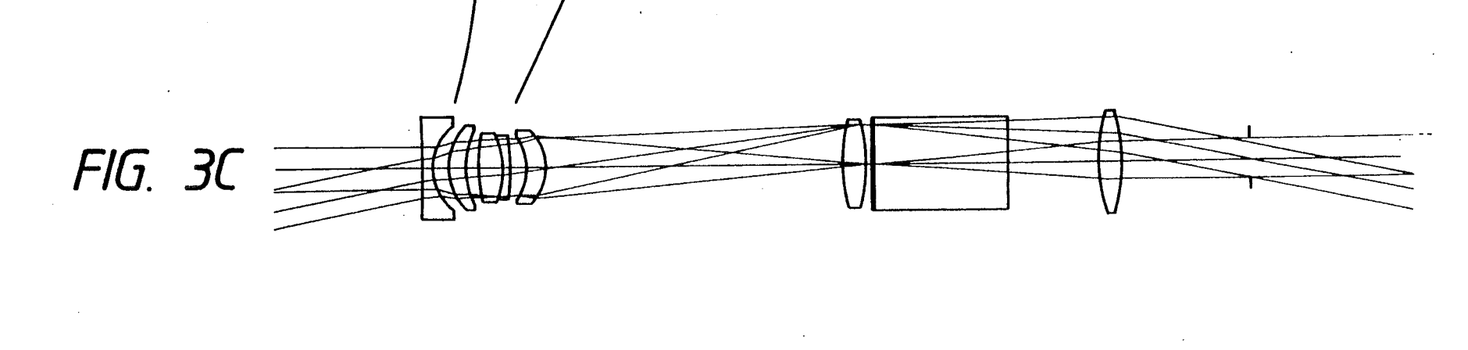
Figure 4A:
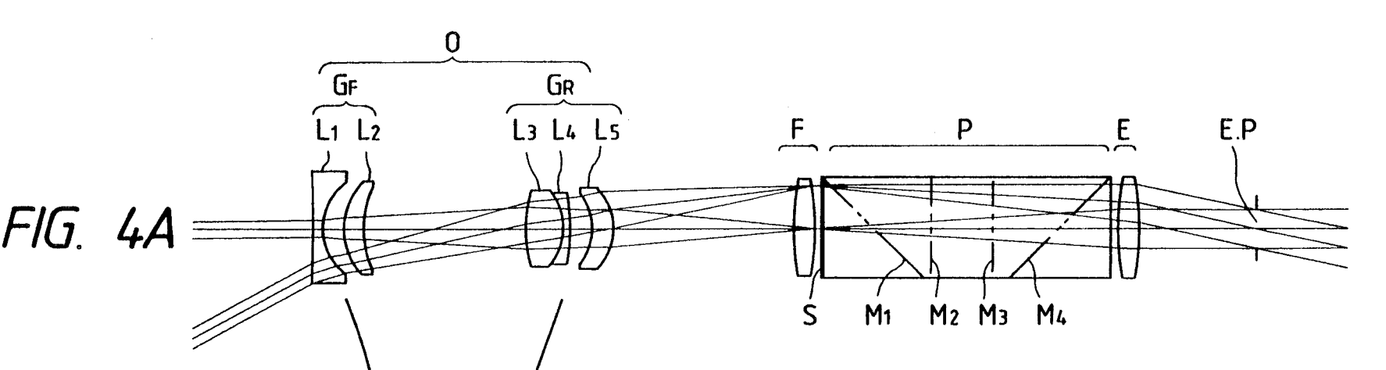
FIGS. 4A to 4C are construction views of finder optical systems showing the optical arrangement and optical path of a fourth embodiment of the present invention.
Figure 4B:
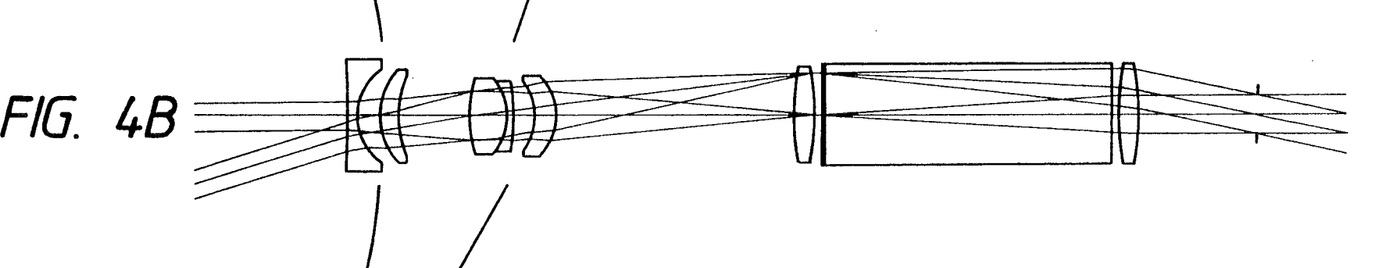
Figure 4C:
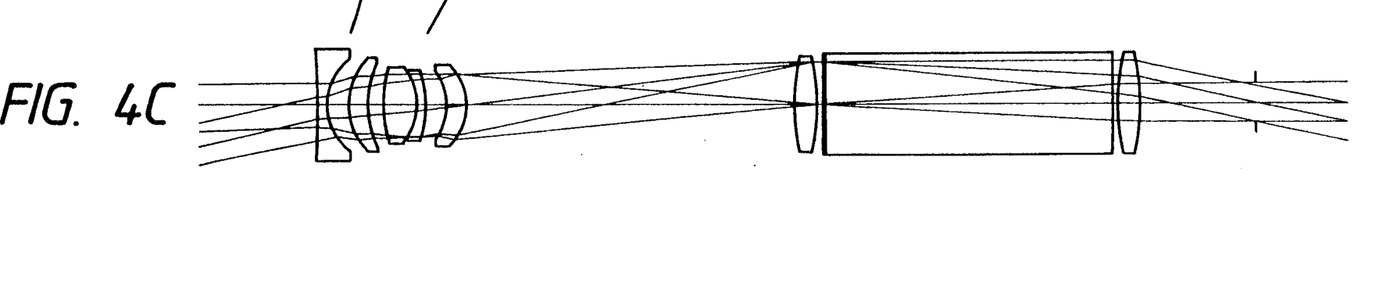
Figure 5A:
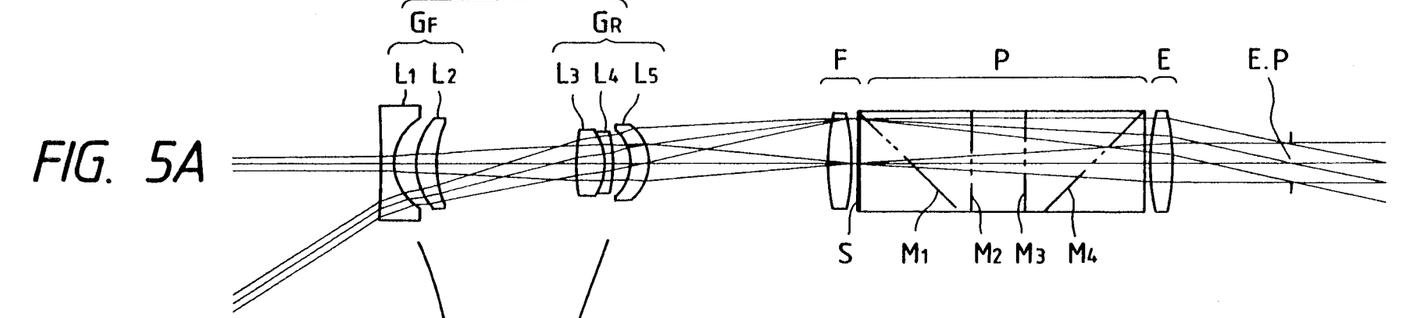
FIGS. 5A to 5C are construction views of finder optical systems showing the optical arrangement and optical path of a fifth embodiment of the present invention.
Figure 5B:
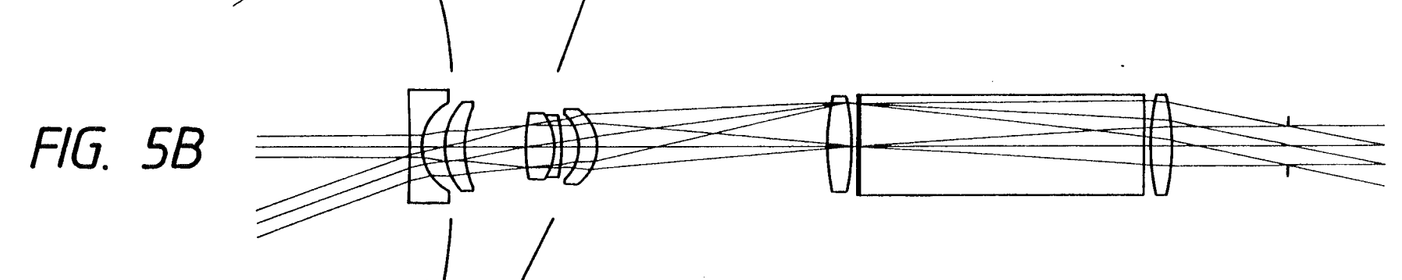
Figure 5C:
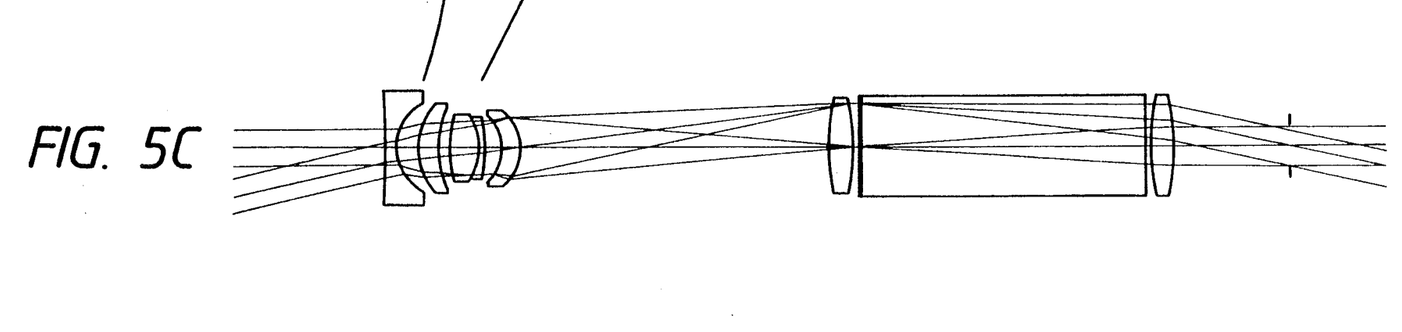
Figure 6A:
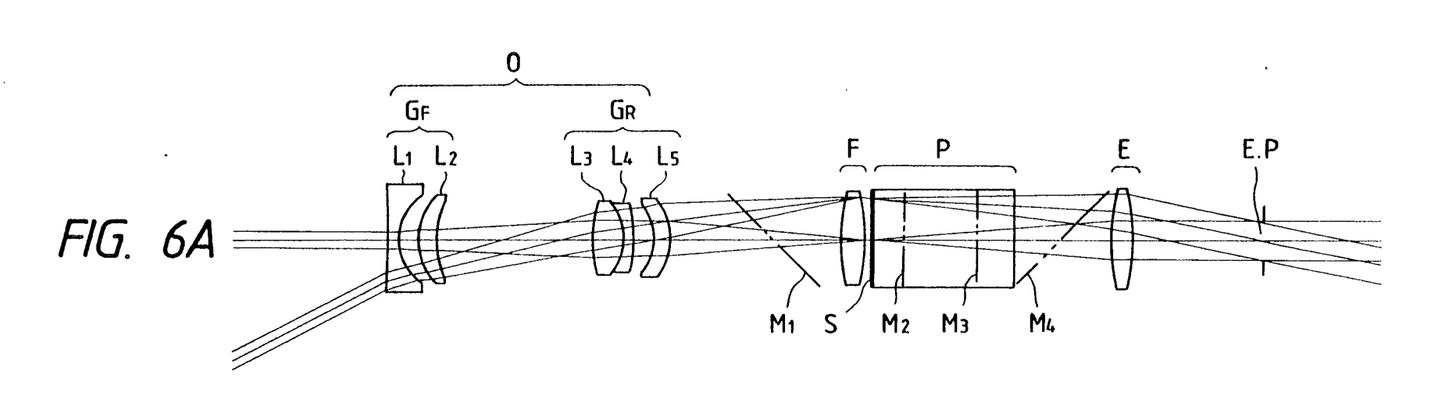
FIGS. 6A to 6C are construction views of finder optical systems showing the optical arrangement and optical path of a sixth embodiment of the present invention.
Figure 6B:
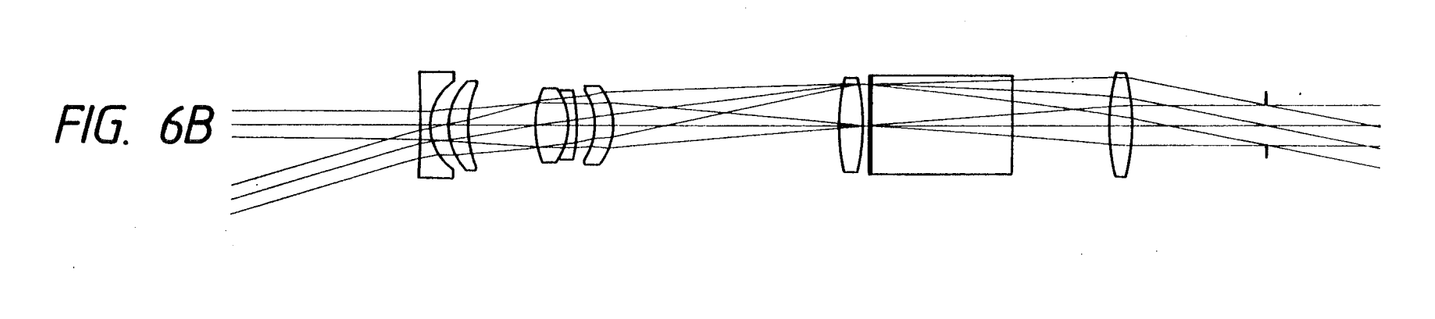
Figure 6C:
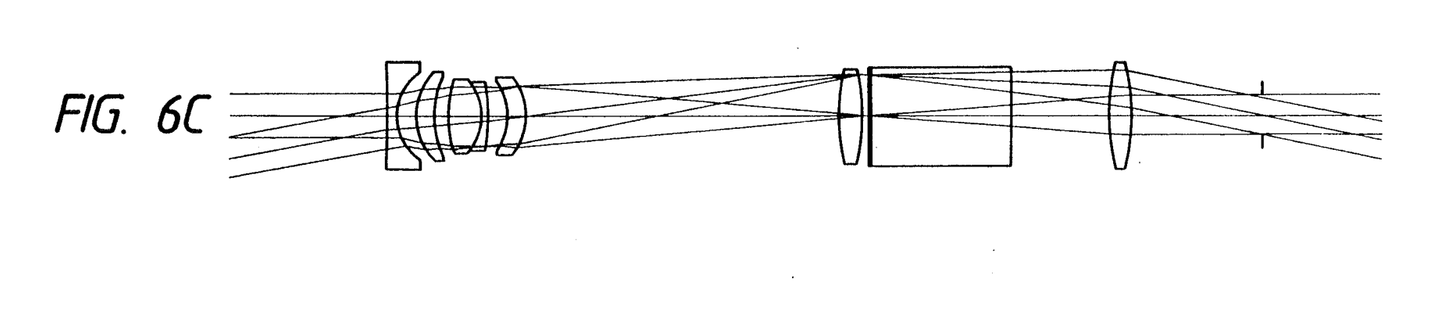

The erection of the image in the third embodiment shown in FIGS. 3A to 3C and the sixth embodiment shown in FIGS. 6A to 6C is accomplished by the total four times of reflection by a reflecting surface $M_L$ provided in the space between the objective lens unit O and the field lens unit F, two reflecting surfaces $M_2$ and $M_3$ provided in the prism P provided more adjacent to the eye-point side than the field lens unit F, and a reflecting surface $M_4$ provided in the space between the prism P and the eyepiece unit E, as schematically indicated by dots-and-dash lines.

Also, the field frame s is provided on the focal plane I of the objective lens O in the optical path view of each embodiment, i.e., on or near that surface of the field lens unit F comprising a planoconvex single lens which is adjacent to the object side, in the first embodiment, and is provided on that surface of the prism P which is adjacent to the object side, in the second to sixth embodiments. The eyepiece unit E in the first embodiment is comprised of two positive lenses $L_{E1}$ and $L_{E2}$, as shown in FIGS. 1A to 1C, and the eyepiece unit E in the second to sixth embodiments is comprised of a single positive lens, as shown in FIGS. 2A to 6C.

The numerical data of the respective embodiments of the present invention will be shown below. In the tables below, the numbers at the left end represent the surface numbers, r represents the radius of curvature, d represents the inter-surface spacing, n represents the refractive index for d-lines ($\lambda = 587.6$ nm), $\nu$ represents the Abbe number, x represents the visibility (diopters), m represents the magnification, $\omega$ represents the angle of incidence (°), and E.P. represents the eye point.

Also, the aspherical surfaces are indicated by the mark * at the right of the surface numbers, and the shape of the aspherical surfaces is represented by the aforementioned polinominal for the aspherical surfaces.

TABLE 1

(1st Embodiment)

$x = -1.00$ Diopter   $m = 0.446x \sim 1.268x$   $2\omega = 55.2° \sim 19.5°$

| | r | d | $\nu$ | n | | |
|---|---|---|---|---|---|---|
| 1 | 88.7854 | 1.5000 | 40.57 | 1.53636 | | |
| 2* | 7.2794 | 3.5000 | | 1.00000 | GF | |
| 3 | 10.0306 | 2.7000 | 28.34 | 1.72825 | | |
| 4 | 12.8643 | (variable) | | 1.00000 | | O |
| 5 | 19.3540 | 4.2000 | 47.10 | 1.62374 | | |
| 6 | −10.5901 | 1.0000 | 25.35 | 1.80518 | GR | |
| 7 | −27.4573 | 2.5000 | | 1.00000 | | |

TABLE 1-continued
(1st Embodiment)

| | | | | | |
|---|---|---|---|---|---|
| 8 | −7.8003 | 2.8000 | 57.57 | 1.49108 | |
| 9 * | −7.1325 | (variable) | | 1.00000 | |
| 10 | ∞ | 1.0000 | 58.80 | 1.52216 | } PL |
| 11 | ∞ | 27.1647 | | 1.00000 | |
| 12 | ∞ | 1.0000 | | 1.00000 | } s |
| 13 | ∞ | 3.8000 | 57.57 | 1.49108 | } F |
| 14 | −16.1000 | 26.0000 | | 1.00000 | |
| 15 * | 28.8300 | 3.2000 | 57.57 | 1.49108 | |
| 16 | −500.0000 | 2.4000 | | 1.00000 | } E |
| 17 | 40.0000 | 2.2000 | 57.57 | 1.49108 | |
| 18 | −500.0000 | 15.0000 | | 1.00000 | |
| 19 | (E.P) | | | 1.00000 | |

| m | 0.4456 | 0.7506 | 1.2682 |
|---|---|---|---|
| d4 | 23.7681 | 9.7130 | 1.3346 |
| d9 | 1.0000 | 9.3190 | 23.4332 |

2nd surface (aspherical surface)
Standard radius of curvature: $R_2 = 7.2794$
Cone coefficient: $k = 0.66$
Aspherical surface coefficient
$C_2 = 0.0$
$C_4 = 9.5397 \times 10^{-6}$   $C_6 = 3.5718 \times 10^{-8}$
$C_8 = -2.2217 \times 10^{-9}$   $C_{10} = -6.3840 \times 10^{-11}$
9th surface (aspherical surface)
Standard radius of curvature: $R_9 = -7.1325$
Cone coefficient: $k = 0.50$
Aspherical surface coefficient
$C_2 = 0.0$
$C_4 = -5.4144 \times 10^{-7}$   $C_6 = 1.7239 \times 10^{-7}$
$C_8 = 1.9200 \times 10^{-9}$   $C_{10} = -1.5859 \times 10^{-10}$
15th surface (aspherical surface)
Standard radius of curvature: $R_{15} = 28.8300$
Cone coefficient: $k = -0.15$
Aspherical surface coefficient
$C_2 = C_4 = C_6 = C_8 = C_{10} = 0.0$ $r_6/f_R = -0.517$,   $r_8/f_5 = -0.109$
$\nu_3 - \nu_4 = 21.75$,   $r_3/f_w = 0.772$
$n_4 - n_3 = 0.181$,   $f_1/f_w = -1.145$
$f_F/f_E = 0.988$
$S_2(0.6 \cdot r_2)/r_2 = 0.1926$
$S_9(0.6 \cdot r_9)/r_9 = 0.1888$

TABLE 2
(2nd Embodiment)

$x = -1.00$ Diopter   $m = 0.352x \sim 0.802x$   $2\omega = 66.3° \sim 29.6°$

| | r | d | ν | n | |
|---|---|---|---|---|---|
| 1 | −124.6175 | 1.5000 | 57.57 | 1.49108 | |
| 2 * | 4.9184 | 2.8000 | | 1.00000 | } GF |
| 3 | 7.8908 | 2.8000 | 57.57 | 1.49108 | |
| 4 | 15.2590 | (variable) | | 1.00000 | |
| 5 | 19.0540 | 3.8000 | 47.10 | 1.62374 | } O |
| 6 | −7.3191 | 1.0000 | 23.01 | 1.86074 | |
| 7 | −14.5631 | 2.2000 | | 1.00000 | } GR |
| 8 | −5.1321 | 2.4000 | 57.57 | 1.49108 | |
| 9 * | −4.9883 | (variable) | | 1.00000 | |
| 10 | 24.3000 | 3.2000 | 57.57 | 1.49108 | } F |
| 11 | −24.3000 | 0.5900 | | 1.00000 | |
| 12 F | ∞ | 0.2000 | | 1.00000 | } s |
| 13 | ∞ | 36.7500 | 56.05 | 1.56883 | } P |
| 14 | ∞ | 0.5000 | | 1.00000 | |
| 15 * | 20.9880 | 3.2000 | 57.57 | 1.49108 | } E |
| 16 | −30.0120 | 15.0000 | | 1.00000 | |
| 17 | (E.P) | | | 1.00000 | |

| m | 0.3523 | 0.5323 | 0.8024 |
|---|---|---|---|
| d4 | 15.6511 | 7.1974 | 1.6303 |
| d9 | 20.5556 | 25.7907 | 33.6434 |

2nd surface (aspherical surface)
Standard radius of curvature: $R_2 = 4.9184$
Cone coefficient: $k = 0.45$
Aspherical surface coefficient

TABLE 2-continued
(2nd Embodiment)

$C_2 = 0.0$
$C_4 = -1.2171 \times 10^{-5}$   $C_6 = -7.7037 \times 10^{-8}$
$C_8 = -1.6670 \times 10^{-8}$   $C_{10} = -3.3790 \times 10^{-10}$
9th surface (aspherical surface)
Standard radius of curvature: $R_9 = -4.9883$
Cone coefficient: $k = 0.56$
Aspherical surface coefficient
$C_2 = 0.0$
$C_4 = 1.0777 \times 10^{-6}$   $C_6 = -7.8899 \times 10^{-7}$
$C_8 = -7.4134 \times 10^{-8}$   $C_{10} = -3.0613 \times 10^{-9}$
15th surface (aspherical surface)
Standard radius of curvature: $R_{15} = 20.9880$
Cone coefficient: $k = -1.35$
Aspherical surface coefficient
$C_2 = C_4 = C_6 = C_{10} = 0.0$
$C_8 = -3.0000 \times 10^{-10}$ $r_6/f_R = -0.457$,   $r_8/f_5 = -0.092$
$\nu_3 - \nu_4 = 24.09$,   $r_3/f_w = 0.822$
$n_4 - n_3 = 0.237$,   $f_1/f_w = -1.000$
$f_F/f_E = 0.984$
$S_2(0.6 \cdot r_2)/r_2 = 0.1877$
$S_9(0.6 \cdot r_9)/r_9 = 0.1903$

TABLE 3
(3rd Embodiment)

$x = -1.00$ Diopter   $m = 0.432x \sim 1.138x$   $2\omega = 55.4° \sim 20.6°$

| | r | d | ν | n | |
|---|---|---|---|---|---|
| 1 | −235.7140 | 1.3000 | 57.57 | 1.49108 | |
| 2 * | 6.0560 | 2.2000 | | 1.00000 | } GF |
| 3 | 7.6264 | 2.3000 | 57.57 | 1.49108 | |
| 4 | 12.0580 | (variable) | | 1.00000 | |
| 5 | 17.7286 | 3.5000 | 47.10 | 1.62374 | } O |
| 6 | −8.5009 | 1.0000 | 23.01 | 1.86074 | |
| 7 | −17.7286 | 2.1000 | | 1.00000 | } GR |
| 8 | −6.2570 | 2.4000 | 57.57 | 1.49108 | |
| 9 * | −5.8860 | (variable) | | 1.00000 | |
| 10 | 26.4930 | 3.0000 | 57.57 | 1.49108 | } F |
| 11 | −26.4930 | 0.6000 | | 1.00000 | |
| 12 | ∞ | 0.2000 | | 1.00000 | } s |
| 13 | ∞ | 17.4000 | 35.09 | 1.57410 | } P |
| 14 | ∞ | 11.6000 | | 1.00000 | |
| 15 * | 19.5350 | 3.0000 | 57.57 | 1.49108 | } E |
| 16 | −29.0090 | 16.0000 | | 1.00000 | |
| 17 | (E.P) | | | 1.00000 | |

| m | 0.4317 | 0.7009 | 1.1379 |
|---|---|---|---|
| d4 | 18.2649 | 7.7415 | 1.2601 |
| d9 | 21.4851 | 27.9666 | 38.4899 |

2nd surface (aspherical surface)
Standard radius of curvature: $R_2 = 6.0560$
Cone coefficient: $k = 0.74$
Aspherical surface coefficient
$C_2 = C_4 = C_6 = C_{10} = 0.0$
$C_8 = -1.3565 \times 10^{-8}$
9th surface (aspherical surface)
Standard radius of curvature: $R_9 = -5.8860$
Cone coefficient: $k = 0.54$
Aspherical surface coefficient
$C_2 = C_4 = C_6 = C_{10} = 0.0$
$C_8 = -1.6108 \times 10^{-8}$
15th surface (aspherical surface)
Standard radius of curvature: $R_{15} = 19.5350$
Cone coefficient: $k = -1.30$
Aspherical surface coefficient
$C_2 = C_4 = C_6 = C_{10} = 0.0$
$C_8 = -6.0000 \times 10^{-10}$ $r_6/f_R = -0.504$,   $r_8/f_5 = -0.097$
$\nu_3 - \nu_4 = 24.09$,   $r_3/f_w = 0.690$
$n_4 - n_3 = 0.237$,   $f_1/f_w = -1.086$
$f_F/f_E = 1.133$
$S_2(0.6 \cdot r_2)/r_2 = 0.1938$

TABLE 3-continued (3rd Embodiment)

$S_9(0.6 \cdot r_9)/r_9 = 0.1898$

TABLE 4

(4th Embodiment)

$x = -1.00$ Diopter   $m = 0.441x \sim 1.157x$   $2\omega = 55.1° \sim 20.7°$

| | r | d | ν | n | | |
|---|---|---|---|---|---|---|
| 1 | −183.3170 | 1.3000 | 57.57 | 1.49108 | | |
| 2 * | 6.8000 | 2.8000 | | 1.00000 | GF | |
| 3 | 8.6130 | 2.5000 | 57.57 | 1.49108 | | |
| 4 | 13.0840 | (variable) | | 1.00000 | | |
| 5 | 14.9115 | 4.8000 | 57.57 | 1.49108 | | O |
| 6 | −7.6347 | 1.1000 | 35.09 | 1.57410 | | |
| 7 | −18.0906 | 2.6000 | | 1.00000 | GR | |
| 8 | −7.3951 | 2.6000 | 57.57 | 1.49108 | | |
| 9 * | −7.0640 | (variable) | | 1.00000 | | |
| 10 | 27.0000 | 3.0000 | 57.57 | 1.49108 | F | |
| 11 | −27.0000 | 0.6000 | | 1.00000 | | |
| 12 | ∞ | 0.2000 | | 1.00000 | } s | |
| 13 | ∞ | 36.7500 | 56.05 | 1.56883 | P | |
| 14 | ∞ | 0.5000 | | 1.00000 | | |
| 15 * | 20.9880 | 3.2000 | 57.57 | 1.49108 | E | |
| 16 | −30.0120 | 15.0000 | | 1.00000 | | |
| 17 | (E.P) | | | 1.00000 | | |

| m | 0.4414 | 0.7146 | 1.1567 |
|---|---|---|---|
| d4 | 20.5472 | 8.9150 | 1.7291 |
| d9 | 22.8174 | 30.0033 | 41.6355 |

2nd surface (aspherical surface)

Standard radius of curvature: $R_2 = 6.8000$
Cone coefficient: $k = 0.75$
Aspherical surface coefficient
$C_2 = 0.0$
$C_4 = -1.5688 \times 10^{-5}$   $C_6 = 5.3510 \times 10^{-7}$
$C_8 = -2.6842 \times 10^{-8}$   $C_{10} = 1.0507 \times 10^{-10}$ 9th surface (aspherical surface)

Standard radius of curvature: $R_9 = -7.0640$
Cone coefficient: $k = 0.55$
Aspherical surface coefficient
$C_2 = 0.0$
$C_4 = 3.3566 \times 10^{-5}$   $C_6 = 1.4917 \times 10^{-7}$
$C_8 = -4.0861 \times 10^{-8}$   $C_{10} = 1.3771 \times 10^{-9}$ 15th surface (aspherical surface)

Standard radius of curvature: $R_{15} = 20.9880$
Cone coefficient: $k = -1.35$
Aspherical surface coefficient
$C_2 = C_4 = C_6 = C_{10} = 0.0$
$C_8 = -3.0000 \times 10^{-10}$ $r_6/f_R = -0.406$,   $r_8/f_5 = -0.0825$
$\nu_3 - \nu_4 = 22.48$,   $r_3/f_w = 0.722$
$n_4 - n_3 = 0.083$,   $f_1/f_w = -1.117$
$f_F/f_E = 1.090$
$S_2(0.6 \cdot r_2)/r_2 = 0.1936$
$S_9(0.6 \cdot r_9)/r_9 = 0.1885$

TABLE 5

(5th Embodiment)

$x = -1.00$ Diopter   $m = 0.377x \sim 0.955x$   $2\omega = 62.7° \sim 24.9°$

| | r | d | ν | n | | |
|---|---|---|---|---|---|---|
| 1 | −190.0107 | 1.5000 | 57.57 | 1.49108 | | |
| 2 * | 5.4223 | 2.8000 | | 1.00000 | GF | |
| 3 | 8.1310 | 2.8000 | 57.57 | 1.49108 | | |
| 4 | 14.3644 | (variable) | | 1.00000 | | |
| 5 | 20.9808 | 3.8000 | 47.10 | 1.62374 | | O |
| 6 | −7.5178 | 1.0000 | 23.01 | 1.86074 | | |
| 7 | −15.0705 | 2.2000 | | 1.00000 | GR | |
| 8 | −5.3189 | 2.4000 | 57.57 | 1.49108 | | |
| 9 * | −5.1795 | (variable) | | 1.00000 | | |
| 10 | 26.0000 | 3.2000 | 57.57 | 1.49108 | F | |
| 11 | −26.0000 | 0.6000 | | 1.00000 | | |
| 12 | ∞ | 0.2000 | | 1.00000 | } s | |
| 13 | ∞ | 36.7500 | 56.05 | 1.56883 | P | |
| 14 | ∞ | 0.5000 | | 1.00000 | | |
| 15 * | 20.9880 | 3.2000 | 57.57 | 1.49108 | E | |
| 16 | −30.0120 | 15.0000 | | 1.00000 | | |
| 17 | (E.P) | | | 1.00000 | | |

| m | 0.3773 | 0.6014 | 0.9551 |
|---|---|---|---|
| d4 | 17.6113 | 7.5325 | 1.2456 |
| d9 | 22.1782 | 28.5209 | 38.5358 |

2nd surface (aspherical surface)

Standard radius of curvature: $R_2 = 5.4223$
Cone coefficient: $k = 0.55$
Aspherical surface coefficient
$C_2 = 0.0$
$C_4 = -2.5560 \times 10^{-5}$   $C_6 = -4.1300 \times 10^{-7}$
$C_8 = -2.1592 \times 10^{-8}$   $C_{10} = -5.3411 \times 10^{-10}$ 9th surface (aspherical surface)

Standard radius of curvature: $R_9 = -5.1795$
Cone coefficient: $k = 0.60$
Aspherical surface coefficient
$C_2 = 0.0$
$C_4 = 2.0029 \times 10^{-6}$   $C_6 = 9.8906 \times 10^{-7}$
$C_8 = -1.2780 \times 10^{-7}$   $C_{10} = 3.3668 \times 10^{-12}$ 15th surface (aspherical surface)

Standard radius of curvature: $R_{15} = 20.9880$
Cone coefficient: $k = -1.35$
Aspherical surface coefficient
$C_2 = C_4 = C_6 = C_{10} = 0.0$
$C_8 = -3.0000 \times 10^{-10}$ $r_6/f_R = -0.442$,   $r_8/f_5 = -0.088$
$\nu_3 - \nu_4 = 24.09$,   $r_3/f_w = 0.794$
$n_4 - n_3 = 0.237$,   $f_1/f_w = -1.045$
$f_F/f_E = 1.056$
$S_2(0.6 \cdot r_2)/r_2 = 0.1892$
$S_9(0.6 \cdot r_9)/r_9 = 0.1909$

TABLE 6

(6th Embodiment)

$x = -1.00$ Diopter   $m = 0.420x \sim 1.108x$   $2\omega = 55.4° \sim 20.6°$

| | r | d | ν | n | | |
|---|---|---|---|---|---|---|
| 1 | −235.7140 | 1.3000 | 57.57 | 1.49100 | | |
| 2 * | 6.0560 | 2.2000 | | 1.00000 | GF | |
| 3 | 7.6264 | 2.3000 | 57.57 | 1.49108 | | |
| 4 | 12.0580 | (variable) | | 1.00000 | | |
| 5 | 12.5310 | 4.0000 | 57.57 | 1.49108 | | O |
| 6 | −7.2470 | 1.1000 | 30.24 | 1.58518 | | |
| 7 | −18.6020 | 2.1000 | | 1.00000 | GR | |
| 8 | −7.6035 | 2.4000 | 57.57 | 1.49108 | | |
| 9 * | −6.9223 | (variable) | | 1.00000 | | |
| 10 | 26.4930 | 3.0000 | 57.57 | 1.49108 | F | |
| 11 | −26.4930 | 0.6000 | | 1.00000 | | |
| 12 | ∞ | 0.2000 | | 1.00000 | } s | |
| 13 | ∞ | 17.4000 | 57.57 | 1.49108 | P | |
| 14 | ∞ | 11.6000 | | 1.00000 | | |
| 15 * | 20.4700 | 3.0000 | 57.57 | 1.49108 | E | |
| 16 | −29.0090 | 16.0000 | | 1.00000 | | |
| 17 | (E.P) | | | 1.00000 | | |

| m | 0.4203 | 0.6825 | 1.1081 |
|---|---|---|---|
| d4 | 18.5626 | 8.0393 | 1.5578 |
| d9 | 20.3018 | 26.7832 | 37.3066 |

2nd surface (aspherical surface)

Standard radius of curvature: $R_2 = 6.0560$
Cone coefficient: $k = 0.74$
Aspherical surface coefficient
$C_2 = C_4 = C_6 = C_{10} = 0.0$
$C_8 = -1.3565 \times 10^{-8}$ 9th surface (aspherical surface)

Standard radius of curvature: $R_9 = -6.9223$
Cone coefficient: $k = 0.35$

TABLE 6-continued (6th Embodiment)

Aspherical surface coefficient
$C_2 = C_4 = C_6 = C_{10} = 0.0$
$C_8 = 3.0000 \times 10^{-8}$ 15th surface (aspherical surface)

Standard radius of curvature: $R_{15} = 20.4700$
Cone coefficient: $k = -1.30$
Aspherical surface coefficient
$C_2 = C_4 = C_6 = C_{10} = 0.0$
$C_8 = -6.0000 \times 10^{-10}$ $r_6/f_R = -0.429$,   $r_8/f_5 = -0.104$
$\nu_3 - \nu_4 = 27.33$,   $r_3/f_w = 0.690$
$n_4 - n_3 = 0.094$,   $f_1/f_w = -1.086$
$f_F/f_E = 1.102$
$S_2(0.6 \cdot r_2)/r_2 = 0.194$
$S_9(0.6 \cdot r_9)/r_9 = 0.185$ Now, a plano-convex lens having its convex surface facing the object side has generally been used as the field lens unit F of this kind, but it has been found that if the field lens unit is so constructed, the occurrence of distortion in the surface thereof adjacent to the object side is remarkable and it is difficult to suppress the fluctuation of the distortion. Therefore, in the first embodiment shown in FIGS. 1A to 1C, the field lens unit F is comprised of a plano-convex lens having its convex surface facing the eye point side, and in the second to sixth embodiments, the field lens unit F is comprised of a biconvex lens, thereby correcting the fluctuation of the distortion well.

Where the field lens unit F is disposed more adjacent to the object side than to the imaging plane of the objective lens unit O as shown in FIGS. 2A to 6C, it is desirable that the field lens unit F be comprised of a biconvex lens, and when the radius of curvature of that surface of this field lens unit F which is adjacent to the object side is $r_{10}$ and the radius of curvature of that surface of this field lens unit which is adjacent to the eye point side is $r_{11}$, it is desirable that the following condition be satisfied:

$$-1.2 < r_{10}/r_{11} < -0.8. \quad (10)$$

If the upper limit of this condition (10) is exceeded, it will be difficult to suppress the fluctuation of distortion, and if the lower limit of this condition (10) is exceeded, it will become difficult to correct negative distortion and astigmatism at the wide angle end at a time.

In the second to sixth embodiments, the field lens unit F is comprised of a biconvex positive lens in which the radius of curvature $r_{10}$ of that surface of the field lens unit F which is adjacent to the object side and the radius of curvature $r_{11}$ of that surface of the field lens unit F which is adjacent to the eyepiece side are made equal to each other so that $r_{10}/r_{11} = -1$ and therefore, advantageously, it becomes unnecessary to confirm the front and back of the lens unit in the assembly process.

The visibility of the finder optical system of each embodiment can be adjusted by moving the eyepiece E. Particularly in the eyepiece of the first embodiment, the visibility can be changed by the movement of only the object side positive lens $L_{E1}$ substantially without the eyepoint side being changed. Moreover, the eyepoint side lens $L_{E2}$ is fixed and this is advantageous for dustproof. In any case, when the eyepiece is moved to the eyepoint side, the visibility becomes plus.

In any of the above-described first, third, fourth, fifth and sixth embodiments, a high magnification change ratio amounting to 2.5 or more is realized and yet, not only chromatic aberration and distortion are corrected very well, but also the fluctuations of these aberrations resulting from a magnification change are corrected at the same time.

Also, in the second and fifth embodiments, a wide angle amounting to 62° or greater is realized and yet, not only chromatic aberration and distortion are corrected very well, but also the fluctuations of these aberrations resulting from a magnification change are corrected at the same time.

Thus, according to the present invention, there is realized a Keplerian finder which is compact and keeps an excellent optical performance in all magnification change ranges and yet has a wide angle or a high magnification change rate that could not be achieved before.

What is claimed is:

1. A Keplerian zoom finder optical system including:
   an objective lens unit comprising a forward group having negative refractive power and a rearward groups having positive refractive power, said objective lens unit having positive refractive power as a whole and having the magnification changing function of changing the finder magnification by the spacing between said forward group and said rearward group being changed;
   an eyepiece unit having positive refractive power for enlarging and observing therethrough a spatial image formed by said objective lens unit; and
   an image erecting optical system for erecting an inverted spatial image formed by said objective lens unit;
   said forward group in said objective lens unit comprising a first lens having negative refractive power and a positive meniscus-shaped second lens having its convex surface facing the object side, and being designed to have negative refractive power as a whole;
   said rearward group in said objective lens unit comprising a biconvex third lens, a negative meniscus-shaped fourth lens cemented to said third lens and having its concave surface facing the object side, and a positive meniscus-shaped fifth lens having its convex surface facing the image side, and being designed to have positive refractive power as a whole.

2. A Keplerian zoom finder optical system according to claim 1, wherein said rearward group in said objective lens unit is further designed to satisfy the following conditions:

$$-0.6 < r_6/f_R < -0.3$$

$$-0.12 < r_8/f_5 < -0.08$$

where
$r_6$: the radius of curvature of the cemented surface of the third lens and the fourth lens in the rearward group,
$f_R$: the focal length of the rearward group,
$r_8$: the radius of curvature of that surface of the fifth lens in the rearward group which faces to the object side,
$f_5$: the focal length of the fifth lens in the rearward group.

3. A Keplerian zoom finder optical system according to claim 1, wherein said rearward group in said objective lens unit is further designed to satisfy the following conditions:

$$-0.12 < r_8/f_5 < -0.08$$

$$18 < \nu_3 - \nu_4 < 26$$

where
- $r_8$: the radius of curvature of that surface of the fifth lens in the rearward group which faces to the object side,
- $f_5$: the focal length of the fifth lens in the rearward group,
- $\nu_3$: the Abbe number of the third lens in the rearward group,
- $\nu_4$: the Abbe number of the fourth lens in the rearward group.

4. A Keplerian zoom finder optical system according to claim 1, wherein said forward group and said rearward group in said objective lens unit are further designed to satisfy the following conditions:

$$0.68 < r_3/f_w < 0.85$$

$$-0.6 < r_6/f_R < -0.3$$

$$-0.12 < r_8/f_5 < -0.08$$

where
- $r_3$: the radius of curvature of that surface of the second lens in the forward group which faces to the object side,
- $f_w$: the combined focal length of the forward group and the rearward group in the objective lens unit at the wide angle end,
- $r_6$: the radius of curvature of the cemented surface of the third lens and the fourth lens in the rearward group,
- $f_R$: the focal length of the rearward group,
- $r_8$: the radius of curvature of that surface of the fifth lens in the rearward group which faces to the object side,
- $f_5$: the focal length of the fifth lens in the rearward group.

5. A Keplerian zoom finder optical system according to claim 1, wherein said rearward group in said objective lens unit is further designed to satisfy the following conditions:

$$-0.6 < r_6/f_R < -0.3$$

$$0.06 < n_4 - n_3 < 0.25$$

$$-0.12 < r_8/f_5 < -0.08$$

where
- $r_6$: the radius of curvature of the cemented surface of the third lens and the fourth lens in the rearward group,
- $f_R$: the focal length of the rearward group,
- $n_3$: the refractive index of the third lens in the rearward group,
- $n_4$: the refractive index of the fourth lens in the rearward group,
- $r_8$: the radius of curvature of that surface of the fifth lens in the rearward group which faces to the object side,
- $f_5$: the focal length of the fifth lens in the rearward group.

6. A Keplerian zoom finder optical system according to claim 1, wherein said forward group and said rearward group in said objective lens unit are further designed to satisfy the following conditions:

$$-1.22 < f_1/f_w < -0.97$$

$$0.68 < r_3/f_w < 0.85$$

$$-0.6 < r_6/f_R < -0.3$$

$$-0.12 < r_8/f_5 < -0.08$$

where
- $f_1$: the focal length of the first lens in the forward group,
- $f_w$: the combined focal length of the forward group and the rearward group in said objective lens unit at the wide angle end,
- $r_3$: the radius of curvature of that surface of the second lens in the forward group which faces to the object side,
- $r_6$: the radius of curvature of the cemented surface of the third lens and the fourth lens in the rearward group,
- $f_R$: the focal length of the rearward group,
- $r_8$: the radius of curvature of that surface of the fifth lens in the rearward group which faces to the object side,
- $f_5$: the focal length of the fifth lens in the rearward group.

7. A Keplerian zoom finder optical system according to claim 1, further including a field lens unit provided near the focus position of said objective lens unit and designed to satisfy the following condition:

$$0.9 < f_R/f_E < 1.2,$$

where $f_F$ is the focal length of said field lens unit, and $f_E$ is the focal length of said eyepiece unit.

8. A keplerian zoom finder optical system according to claim 7, wherein said field lens unit is comprised of a plano-convex single lens having its planar surface positioned near the focus position of said objective lens unit and having its convex surface facing the eye point side.

9. A Keplerian zoom finder optical system according to claim 7, wherein said field lens unit is comprised of a biconvex single lens and is disposed more adjacent to the object side than to the focus position of said objective lens unit.

10. A Keplerian zoom finder optical system according to claim 9, wherein said biconvex field lens is designed to satisfy the following condition:

$$-1.2 < r_{10}/r_{11} < -0.8,$$

where $r_{10}$ is the radius of curvature of the surface thereof which faces to the object side, and $r_{11}$ is the radius of curvature of the surface thereof which faces to the eye point side.

11. A Keplerian zoom finder optical system according to claim 1, wherein said first lens and said fifth lens in said objective lens unit have their image side surfaces formed into aspherical surfaces, and the aspherical shape indicated by the distance of the vertex of the aspherical surface at a height y in the vertical direction from the optical axis from the tangential plane along the direction of the optical axis is expressed by the following general expression:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} y^{10}$$

where k is the cone coefficient, $A_n$ is the nth-order aspherical surface coefficient and R is the standard radius of curvature, and when the paraxial radius of curvature r of the aspherical surfaces is $r = 1/(2 \cdot A_2 + 1/R)$, the shapes of the aspherical surfaces of said first lens and said fifth lens are formed so as to satisfy the following conditions:

$$0.180 \cdot r_2 < S_2(0.6 \cdot r_2) < 0.196 \cdot r_2$$

$$0.180 \cdot r_9 < S_9(0.6 \cdot r_9) < 0.195 \cdot r_9$$

where $r_2$: the paraxial radius of curvature of the aspherical surface of the first lens which faces to the image side, $r_9$: the paraxial radius of curvature of the aspherical surface of the fifth lens which faces to the image side, $S_2(y)$: the aspherical shape of that surface of the first lens which is adjacent to the image side, $S_9(y)$: the aspherical shape of that surface of the fifth lens which is adjacent to the image side.

12. A Keplerian zoom finder optical system according to claim 1, which is designed in accordance with the following data:

| | x = −1.00 Diopter m = 0.446 x ∼ 1.268 x 2ω = 55.2° ∼ 19.5° | | | | |
|---|---|---|---|---|---|
| | r | d | ν | n | |
| 1 | 88.7854 | 1.5000 | 40.57 | 1.53636 | GF |
| 2 * | 7.2794 | 3.5000 | | 1.00000 | |
| 3 | 10.0306 | 2.7000 | 28.34 | 1.72825 | |
| 4 | 12.8643 | (variable) | | 1.00000 | |
| 5 | 19.3540 | 4.2000 | 47.10 | 1.62374 | GR |
| 6 | −10.5901 | 1.0000 | 25.35 | 1.80518 | |
| 7 | −27.4573 | 2.5000 | | 1.00000 | |
| 8 | −7.8003 | 2.8000 | 57.57 | 1.49108 | |
| 9 * | −7.1325 | (variable) | | 1.00000 | |
| 10 | ∞ | 1.0000 | 58.80 | 1.52216 | PL |
| 11 | ∞ | 27.1647 | | 1.00000 | |
| 12 | ∞ | 1.0000 | | 1.00000 | s |
| 13 | ∞ | 3.8000 | 57.57 | 1.49108 | F |
| 14 | −16.1000 | 26.0000 | | 1.00000 | |
| 15 * | 28.8300 | 3.2000 | 57.57 | 1.49108 | |
| 16 | −500.0000 | 2.4000 | | 1.00000 | |
| 17 | 40.0000 | 2.2000 | 57.57 | 1.49108 | E |
| 18 | −500.0000 | 15.0000 | | 1.00000 | |
| 19 | (E. P) | | | 1.00000 | |
| m | 0.4456 | 0.7506 | | 1.2682 | |
| d4 | 23.7681 | 9.7130 | | 1.3346 | |
| d9 | 1.0000 | 9.3190 | | 23.4332 | |

2nd surface (aspherical surface)
Standard radius of curvature: $R_2 = 7.2794$
Cone coefficient: $k = 0.66$
Aspherical surface coefficient
$C_2 = 0.0$
$C_4 = 9.5397 \times 10^{-6}$    $C_6 = 3.5718 \times 10^{-8}$
$C_8 = -2.2217 \times 10^{-9}$    $C_{10} = -6.3840 \times 10^{-11}$
9th surface (aspherical surface)
Standard radius of curvature: $R_9 = -7.1325$
Cone coefficient: $k = 0.50$
Aspherical surface coefficient
$C_2 = 0.0$
$C_4 = -5.4144 \times 10^{-7}$    $C_6 = 1.7239 \times 10^{-7}$
$C_8 = 1.9200 \times 10^{-9}$    $C_{10} = -1.5859 \times 10^{-10}$ -continued 15th surface (aspherical surface)
Standard radius of curvature: $R_{15} = 28.8300$
Cone coefficient: $k = -0.15$
Aspherical surface coefficient
$C_2 = C_4 = C_6 = C_8 = C_{10} = 0.0$
$r_6/f_R = -0.517$, $r_8/f_5 = -0.109$
$\nu_3 - \nu_4 = 21.75$, $r_3/f_w = 0.772$
$n_4 - n_3 = 0.181$, $f_1/f_w = -1.145$
$f_F/f_E = 0.988$
$S_2(0.6 \cdot r_2)/r_2 = 0.1926$
$S_9(0.6 \cdot r_9)/r_9 = 0.1888$ where the numbers at the left end represent the surface numbers, r represents the radius of curvature, a represents the inter-surface spacing. n represents the refractive index for d-lines (λ=587.6 nm), ν represents the Abbe number, x represents the visibility (diopters), m represents the magnification, ω represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10}$$

where k is the cone coefficient, $A_n$ is the nth-order aspherical surface coefficient, and R is the standard radius of curvature, and the paraxial radius of curvature r of the aspherical surfaces is indicated by $r = 1/(2 \cdot A_2 + 1/R)$.

13. A Keplerian zoom finder optical system according to claim 1, which is designed in accordance with the following data:

| | x = −1.00 Diopter m = 0.352 x ∼ 0.802 x 2ω = 66.3° ∼ 29.6° | | | | |
|---|---|---|---|---|---|
| | r | d | ν | n | |
| 1 | −124.6175 | 1.5000 | 57.57 | 1.49108 | GF |
| 2 * | 4.9184 | 2.8000 | | 1.00000 | |
| 3 | 7.8908 | 2.8000 | 57.57 | 1.49108 | |
| 4 | 15.2590 | (variable) | | 1.00000 | |
| 5 | 19.0540 | 3.8000 | 47.10 | 1.62374 | GR |
| 6 | −7.3191 | 1.0000 | 23.01 | 1.86074 | |
| 7 | −14.5631 | 2.2000 | | 1.00000 | |
| 8 | −5.1321 | 2.4000 | 57.57 | 1.49108 | |
| 9 * | −4.9883 | (variable) | | 1.00000 | |
| 10 | 24.3000 | 3.2000 | 57.57 | 1.49108 | F |
| 11 | −24.3000 | 0.5900 | | 1.00000 | |
| 12 F | ∞ | 0.2000 | | 1.00000 | s |
| 13 | ∞ | 36.7500 | 56.05 | 1.56883 | P |
| 14 | ∞ | 0.5000 | | 1.00000 | |
| 15 * | 20.9880 | 3.2000 | 57.57 | 1.49108 | E |
| 16 | −30.0120 | 15.0000 | | 1.00000 | |
| 17 | (E. P) | | | 1.00000 | |
| m | 0.3523 | 0.5323 | | 0.8024 | |
| d4 | 15.6511 | 7.1974 | | 1.6303 | |
| d9 | 20.5556 | 25.7907 | | 33.6434 | |

2nd surface (aspherical surface)
Standard radius of curvature: $R_2 = 4.9184$
Cone coefficient: $k = 0.45$
Aspherical surface coefficient
$C_2 = 0.0$
$C_4 = -1.2171 \times 10^{-5}$    $C_6 = -7.7037 \times 10^{-8}$
$C_8 = -1.6670 \times 10^{-8}$    $C_{10} = -3.3790 \times 10^{-10}$
9th surface (aspherical surface)
Standard radius of curvature: $R_9 = -4.9883$ -continued

```
Cone coefficient: k = 0.56
Aspherical surface coefficient
C_2 = 0.0
C_4 = 1.0777 × 10^-6    C_6 = -7.8899 × 10^-7
C_8 = -7.4134 × 10^-8   C_10 = -3.0613 × 10^-9
15th surface (aspherical surface)
Standard radius of curvature: R_15 = 20.9880
Cone coefficient: k = -1.35
Aspherical surface coefficient
C_2 = C_4 = C_6 = C_10 = 0.0
C_8 = -3.0000 × 10^-10
r_6/f_R = -0.457, r_8/f_5 = -0.092
ν_3 - ν_4 = 24.09, r_3/f_w = 0.822
n_4 - n_3 = 0.237, f_1/f_w = -1.000
f_F/f_E = 0.984
S_2(0.6·r_2)/r_2 = 0.1877
S_9(0.6·r_9)/r_9 = 0.1903
``` where the numbers at the left end represent the surface numbers, r represents the radius of curvature, a represents the inter-surface spacing, n represents the refractive index for d-lines (λ=587.6 nm), ν represents the Abbe number, x represents the visibility (diopters), m represents the magnification, ω represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10}$$

where k is the cone constant, $A_n$ is the nth-order aspherical surface coefficient, and R is the standard radius of curvature, and the paraxial radius of curvature r of the aspherical surfaces is indicated by $r = 1/(2 \cdot A_2 + 1/R)$.

14. A Keplerian zoom finder optical system according to claim 1, which is designed in accordance with the following data:

| | x = -1.00 Diopter | m = 0.432 x~1.138 x | | |
|---|---|---|---|---|
| | 2ω = 55.4°~20.6° | | | |
| | r | d | ν | n |
| 1 | -235.7140 | 1.3000 | 57.57 | 1.49108 |
| 2 * | 6.0560 | 2.2000 | | 1.00000 |
| 3 | 7.6264 | 2.3000 | 57.57 | 1.49108 |
| 4 | 12.0580 | (variable) | | 1.00000 |
| 5 | 17.7286 | 3.5000 | 47.10 | 1.62374 |
| 6 | -8.5009 | 1.0000 | 23.01 | 1.86074 |
| 7 | -17.7286 | 2.1000 | | 1.00000 |
| 8 | -6.2570 | 2.4000 | 57.57 | 1.49108 |
| 9 * | -5.8860 | (variable) | | 1.00000 |
| 10 | 26.4930 | 3.0000 | 57.57 | 1.49108 |
| 11 | -26.4930 | 0.6000 | | 1.00000 |
| 12 | ∞ | 0.2000 | | 1.00000 |
| 13 | ∞ | 17.4000 | 35.09 | 1.57410 |
| 14 | ∞ | 11.6000 | | 1.00000 |
| 15 * | 19.5350 | 3.0000 | 57.57 | 1.49108 |
| 16 | -29.0090 | 16.0000 | | 1.00000 |
| 17 | (E. P) | | | 1.00000 |
| m | 0.4317 | 0.7009 | | 1.1379 |
| d4 | 18.2649 | 7.7415 | | 1.2601 |
| d9 | 21.4851 | 27.9666 | | 38.4899 |

```
2nd surface (aspherical surface)
Standard radius of curvature: R_2 = 6.0560
Cone coefficient: k = 0.74
Aspherical surface coefficient
C_2 = C_4 = C_6 = C_10 = 0.0
C_8 = -1.3565 × 10^-8
9th surface (aspherical surface)
Standard radius of curvature: R_9 = -5.8860
Cone coefficient: k = 0.54
Aspherical surface coefficient
C_2 = C_4 = C_6 = C_10 = 0.0
C_8 = -1.6108 × 10^-8
15th surface (aspherical surface)
Standard radius of curvature: R_15 = 19.5350
Cone coefficient: k = -1.30
Aspherical surface coefficient
C_2 = C_4 = C_6 = C_10 = 0.0
C_8 = -6.0000 × 10^-10
r_6/f_R = -0.504, r_8/f_5 = -0.097
ν_3 - ν_4 = 24.09, r_3/f_w = 0.690
n_4 - n_3 = 0.237, f_1/f_w = -1.086
f_F/f_E = 1.133
S_2(0.6·r_2)/r_2 = 0.1938
S_9(0.6·r_9)/r_9 = 0.1898
``` where the numbers at the left end represent the surface numbers, r represents the radius of curvature, d represents the inter-surface spacing, n represents the refractive index for d-lines (λ=587.6 nm), ν represents the Abbe number, x represents the visibility (diopters), m represents the magnification, ω represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10}$$

where k is the cone coefficient, $A_n$ is the nth-order aspherical surface coefficient, and R is the standard radius of curvature, and the paraxial radius of curvature r of the aspherical surfaces is indicated by $r = 1/(2 \cdot A_2 + 1/R)$.

15. A Keplerian zoom finder optical system according to claim 1, which is designed in accordance with the following data:

| | x = -1.00 Diopter | m = 0.441 x~1.157 x | | |
|---|---|---|---|---|
| | 2ω = 55.1°~20.7° | | | |
| | r | d | ν | n |
| 1 | -183.3170 | 1.3000 | 57.57 | 1.49108 |
| 2 * | 6.8000 | 2.8000 | | 1.00000 |
| 3 | 8.6130 | 2.5000 | 57.57 | 1.49108 |
| 4 | 13.0840 | (variable) | | 1.00000 |
| 5 | 14.9115 | 4.8000 | 57.57 | 1.49108 |
| 6 | -7.6347 | 1.1000 | 35.09 | 1.57410 |
| 7 | -18.0906 | 2.6000 | | 1.00000 |
| 8 | -7.3951 | 2.6000 | 57.57 | 1.49108 |
| 9 * | -7.0640 | (variable) | | 1.00000 |
| 10 | 27.0000 | 3.0000 | 57.57 | 1.49108 |
| 11 | -27.0000 | 0.6000 | | 1.00000 |
| 12 | ∞ | 0.2000 | | 1.00000 |
| 13 | ∞ | 36.7500 | 56.05 | 1.56883 |
| 14 | ∞ | 0.5000 | | 1.00000 |
| 15 * | 20.9880 | 3.2000 | 57.57 | 1.49108 |
| 16 | -30.0120 | 15.0000 | | 1.00000 |
| 17 | (E. P) | | | 1.00000 |
| m | 0.4414 | 0.7146 | | 1.1567 |
| d4 | 20.5472 | 8.9150 | | 1.7291 |

-continued

| | | | |
|---|---|---|---|
| d9 | 22.8174 | 30.0033 | 41.6355 |

2nd surface (aspherical surface)
Standard radius of curvature: $R_2 = 6.8000$
Cone coefficient: $k = 0.75$
Aspherical surface coefficient
$C_2 = 0.0$
$C_4 = -1.5688 \times 10^{-5}$   $C_6 = 5.3510 \times 10^{-7}$
$C_8 = -2.6842 \times 10^{-8}$   $C_{10} = 1.0507 \times 10^{-10}$ 9th surface (aspherical surface)
Standard radius of curvature: $R_9 = -7.0640$
Cone coefficient: $k = 0.55$
Aspherical surface coefficient
$C_2 = 0.0$
$C_4 = 3.3566 \times 10^{-5}$   $C_6 = 1.4917 \times 10^{-7}$
$C_8 = -4.0861 \times 10^{-8}$   $C_{10} = 1.3771 \times 10^{-9}$ 15th surface (aspherical surface)
Standard radius of curvature: $R_{15} = 20.9880$
Cone coefficient: $k = -1.35$
Aspherical surface coefficient
$C_2 = C_4 = C_6 = C_{10} = 0.0$
$C_8 = -3.0000 \times 10^{-10}$
$r_6/f_R = -0.406$, $r_8/f_5 = -0.0825$
$\nu_3 - \nu_4 = 22.48$, $r_3/f_w = 0.722$
$n_4 - n_3 = 0.083$, $f_1/f_w = -1.117$
$f_F/f_E = 1.090$
$S_2(0.6 \cdot r_2)/r_2 = 0.1936$
$S_9(0.6 \cdot r_9)/r_9 = 0.1885$ where the numbers at the left and represent the surface numbers, r represents the radius of curvature, d represents the inter-surface spacing, n represents the refractive index for d-lines (λ=587.6 nm), ν represents the Abbe number, x represents the visibility (diopters), m represents the magnification, ω represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10}$$

where k is the cone coefficient, $A_n$ is the nth-order aspherical surface coefficient, and R is the standard radius of curvature, and the paraxial radius of curvature r of the aspherical surfaces is indicated by $r = 1/(2 \cdot A_2 + 1/R)$.

16. A Keplerian zoom finder optical system according to claim 1, which is designed in accordance with the following data:

| x = −1.00 Diopter m = 0.377 x∼0.955 x | | | | | |
|---|---|---|---|---|---|
| 2ω = 62.7°∼24.9° | | | | | |
| | r | d | ν | n | |
| 1 | −190.0107 | 1.5000 | 57.57 | 1.49108 | ⎫ |
| 2 * | 5.4223 | 2.8000 | | 1.00000 | ⎬ GF |
| 3 | 8.1310 | 2.8000 | 57.57 | 1.49108 | ⎪ |
| 4 | 14.3644 | (variable) | | 1.00000 | ⎭ |
| 5 | 20.9808 | 3.8000 | 47.10 | 1.62374 | ⎫ O |
| 6 | −7.5178 | 1.0000 | 23.01 | 1.86074 | ⎪ |
| 7 | −15.0705 | 2.2000 | | 1.00000 | ⎬ GR |
| 8 | −51.3189 | 2.4000 | 57.57 | 1.49108 | ⎪ |
| 9 * | −5.1795 | (variable) | | 1.00000 | ⎭ |
| 10 | 26.0000 | 3.2000 | 57.57 | 1.49108 | ⎱ F |
| 11 | −26.0000 | 0.6000 | | 1.00000 | ⎰ |
| 12 | ∞ | 0.2000 | | 1.00000 | } s |
| 13 | ∞ | 36.7500 | 56.05 | 1.56883 | ⎱ P |
| 14 | ∞ | 0.5000 | | 1.00000 | ⎰ |
| 15 * | 20.9880 | 3.2000 | 57.57 | 1.49108 | ⎱ E |
| 16 | −30.0120 | 15.0000 | | 1.00000 | ⎰ |
| 17 | (E. P) | | | 1.00000 | |

| | m | 0.3773 | 0.6014 | 0.9551 |
|---|---|---|---|---|
| | d4 | 17.6113 | 7.5325 | 1.2456 |
| | d9 | 22.1782 | 28.5209 | 38.5358 |

2nd surface (aspherical surface)
Standard radius of curvature: $R_2 = 5.4223$
Cone coefficient: $k = 0.55$
Aspherical surface coefficient
$C_2 = 0.0$
$C_4 = -2.5560 \times 10^{-5}$   $C_6 = -4.1300 \times 10^{-7}$
$C_8 = -2.1592 \times 10^{-8}$   $C_{10} = -5.3411 \times 10^{-10}$ 9th surface (aspherical surface)
Standard radius of curvature: $R_9 = -5.1795$
Cone coefficient: $k = 0.60$
Aspherical surface coefficient
$C_2 = 0.0$
$C_4 = 2.0029 \times 10^{-6}$   $C_6 = 9.8906 \times 10^{-7}$
$C_8 = -1.2780 \times 10^{-7}$   $C_{10} = 3.3668 \times 10^{-12}$ 15th surface (aspherical surface)
Standard radius of curvature: $R_{15} = 20.9880$
Cone coefficient: $k = -1.35$
Aspherical surface coefficient
$C_2 = C_4 = C_6 = C_{10} = 0.0$
$C_8 = -3.0000 \times 10^{-10}$
$r_6/f_R = -0.442$, $r_8/f_5 = -0.088$
$\nu_3 - \nu_4 = 24.09$, $r_3/f_w = 0.794$
$n_4 - n_3 = 0.237$, $f_1/f_w = -1.045$
$f_F/f_E = 1.056$
$S_2(0.6 \cdot r_2)/r_2 = 0.1892$
$S_9(0.6 \cdot r_9)/r_9 = 0.1909$ where the numbers at the left end represent the surface numbers, r represents the radius of curvature, d represents the inter-surface spacing, n represents the refractive index for d-lines (λ=587.6 nm), ν represents the Abbe number, x represents the visibility (diopters), m represents the magnification, ω represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10}$$

where k is the cone coefficient, An is the nth-order aspherical surface coefficient, and R is the standard radius of curvature, and the paraxial radius of curvature r of the aspherical surfaces is indicated by $r = 1/(2 \cdot A_2 + 1/R)$.

17. A Keplerian zoom finder optical system according to claim 1, which is designed in accordance with the following data:

| x = −1.00 Diopter m = 0.420 x∼1.108 x | | | | | |
|---|---|---|---|---|---|
| 2ω = 55.4°∼20.6° | | | | | |
| | r | d | ν | n | |
| 1 | −235.7140 | 1.3000 | 57.57 | 1.49108 | ⎫ |
| 2 * | 6.0560 | 2.2000 | | 1.00000 | ⎬ GF |
| 3 | 7.6264 | 2.3000 | 57.57 | 1.49108 | ⎪ |
| 4 | 12.0580 | (variable) | | 1.00000 | ⎭ |
| 5 | 12.5310 | 4.0000 | 57.57 | 1.49108 | ⎫ O |
| 6 | −7.2470 | 1.1000 | 30.24 | 1.58518 | ⎪ |
| 7 | −18.6020 | 2.1000 | | 1.00000 | ⎬ GR |
| 8 | −7.6035 | 2.4000 | 57.57 | 1.49108 | ⎪ |
| 9 * | −6.9223 | (variable) | | 1.00000 | ⎭ |
| 10 | 26.4930 | 3.0000 | 57.57 | 1.49108 | |

-continued

| | | | | |
|---|---|---|---|---|
| 11 | −26.4930 | 0.6000 | | 1.00000 } F |
| 12 | ∞ | 0.2000 | | 1.00000 } s |
| 13 | ∞ | 17.4000 | 57.57 | 1.49108 |
| | | | | P |
| 14 | ∞ | 11.6000 | | 1.00000 |
| 15 * | 20.4700 | 3.0000 | 57.57 | 1.49108 } E |
| 16 | −29.0090 | 16.0000 | | 1.00000 |
| 17 | (E. P) | | | 1.00000 |
| m | 0.4203 | 0.6825 | | 1.1081 |
| d4 | 18.5626 | 8.0393 | | 1.5578 |
| d9 | 20.3018 | 26.7832 | | 37.3066 |

2nd surface (aspherical surface)
Standard radius of curvature: $R_2 = 6.0560$
Cone coefficient: $k = 0.74$
Aspherical surface coefficient
$C_2 = C_4 = C_6 = C_{10} = 0.0$
$C_8 = -1.3565 \times 10^{-8}$

9th surface (aspherical surface)
Standard radius of curvature: $R_9 = -6.9223$
Cone coefficient: $k = 0.35$
Aspherical surface coefficient
$C_2 = C_4 = C_6 = C_{10} = 0.0$
$C_8 = 3.0000 \times 10^{-8}$

15th surface (aspherical surface)
Standard radius of curvature: $R_{15} = 20.4700$
Cone coefficient: $k = -1.30$
Aspherical surface coefficient
$C_2 = C_4 = C_6 = C_{10} = 0.0$
$C_8 = -6.0000 \times 10^{-10}$
$r_6/f_R = -0.429$, $r_8/f_5 = -0.104$

-continued $\nu_3 - \nu_4 = 27.33$, $r_3/f_w = 0.690$
$n_4 - n_3 = 0.094$, $f_1/f_w = -1.086$
$f_F/f_E = 1.102$
$S_2(0.6 \cdot r_2)/r_2 = 0.194$
$S_9(0.6 \cdot r_9)/r_9 = 0.185$ where the numbers at the left end represent the surface numbers, r represents the radius of curvature, d represents the inter-surface spacing, n represents the refractive index for d-lines ($\lambda = 587.6$ nm), $\nu$ represents the Abbe number, x represents the visibility (diopters), m represents the magnification, $\omega$ represents the angle of incidence (°), and E.P. represents the eye point, the aspherical surfaces are indicated by the mark * at the right of the surface numbers, and the shape of the aspherical surfaces is represented by the following polynominal:

$$S(y) = \frac{y^2/R}{1 + (1 - k \cdot y^2/R^2)^{\frac{1}{2}}} + A_2 y^2 + A_4 y^4 + A_6 y^6 + A_8 y^8 + A_{10} \cdot y^{10}$$

where k is the cone coefficient, An is the nth-order aspherical surface coefficient, and R is the standard radius of curvature, and the paraxial radius of curvature r of the aspherical surfaces is indicated by $r = 1/(2 \cdot A_2 + 1/R)$.

* * * * *